(12) United States Patent
Park et al.

(10) Patent No.: US 11,091,625 B2
(45) Date of Patent: Aug. 17, 2021

(54) THERMOPLASTIC RESIN COMPOSITION OF COPOLYMERS AND METHOD OF PREPARING THE SAME

(71) Applicant: LG CHEM, LTD., Seoul (KR)

(72) Inventors: Chun Ho Park, Daejeon (KR); Yong Yeon Hwang, Daejeon (KR); Bong Keun Ahn, Daejeon (KR); Min Jung Kim, Daejeon (KR); Yong Hee An, Daejeon (KR); Wang Rae Joe, Daejeon (KR); Jang Won Park, Daejeon (KR); Jeong Min Jang, Daejeon (KR); Ji Yoon Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/626,800

(22) PCT Filed: Jan. 17, 2019

(86) PCT No.: PCT/KR2019/000721
§ 371 (c)(1),
(2) Date: Dec. 26, 2019

(87) PCT Pub. No.: WO2019/146963
PCT Pub. Date: Aug. 1, 2019

(65) Prior Publication Data
US 2020/0115540 A1   Apr. 16, 2020

(30) Foreign Application Priority Data

Jan. 24, 2018   (KR) ........................ 10-2018-0008943
Jan. 16, 2019   (KR) ........................ 10-2019-0005689

(51) Int. Cl.
| | |
|---|---|
| *C08L 51/04* | (2006.01) |
| *C08L 33/08* | (2006.01) |
| *C08L 33/12* | (2006.01) |
| *C08K 5/092* | (2006.01) |

(52) U.S. Cl.
CPC .............. *C08L 51/04* (2013.01); *C08L 33/08* (2013.01); *C08L 33/12* (2013.01); *C08K 5/092* (2013.01)

(58) Field of Classification Search
CPC ...... C08L 51/04; C08L 2205/03; C08L 25/12; C08L 33/12; C08L 33/08; C08F 2/24; C08K 5/092
See application file for complete search history.

(56) References Cited

U.S. PATENT DOCUMENTS

| | | | |
|---|---|---|---|
| 6,689,827 B1 | 2/2004 | Schade et al. | |
| 6,777,492 B1* | 8/2004 | Nakai | .................... C08F 265/04 524/504 |
| 2003/0153710 A1 | 8/2003 | Shin et al. | |
| 2005/0038161 A1 | 2/2005 | O'Rourke et al. | |
| 2015/0051333 A1* | 2/2015 | Ahn | ........................ C08L 55/02 524/504 |
| 2016/0152806 A1 | 6/2016 | Park et al. | |
| 2016/0333176 A1 | 11/2016 | Kim et al. | |
| 2017/0260384 A1 | 9/2017 | Choi et al. | |
| 2017/0292017 A1* | 10/2017 | Jung | ........................ C08L 35/00 |

FOREIGN PATENT DOCUMENTS

| | | |
|---|---|---|
| JP | 2005533170 A | 11/2005 |
| JP | 2007070393 A | 3/2007 |
| KR | 1020030003950 A | 1/2003 |
| KR | 20030046055 A | 6/2003 |
| KR | 20090072829 A | 7/2009 |
| KR | 20100045830 A | 5/2010 |
| KR | 20130057795 A | 6/2013 |
| KR | 20130078379 A | 7/2013 |
| KR | 20140096748 A | 8/2014 |
| KR | 20140108101 A | 9/2014 |
| KR | 20150021481 A | 3/2015 |
| KR | 20150038975 A | 4/2015 |
| KR | 20150067736 A | 6/2015 |
| KR | 101802021 B1 | 12/2017 |

OTHER PUBLICATIONS

Anonymous, Alkenylsuccinic anhydrides, Wikipedia, Oct. 1, 2020.*
Search Report dated Apr. 20, 2020 for European Application No. 19744439.1.
Search Report dated Apr. 17, 2019 for PCT Application No. PCT/KR2019/000721.

* cited by examiner

*Primary Examiner* — Jeffrey C Mullis

(57) ABSTRACT

Provided is a thermoplastic resin composition including: a first copolymer including an acrylic rubber-based graft copolymer and an emulsifier including an acid salt; a second copolymer including a unit derived from an alkyl acrylate-based monomer and a unit derived from an alkyl methacrylate-based monomer; and a third copolymer including a unit derived from an aromatic vinyl-based monomer and a unit derived from a vinyl cyan-based monomer.

11 Claims, No Drawings

THERMOPLASTIC RESIN COMPOSITION OF COPOLYMERS AND METHOD OF PREPARING THE SAME

CROSS-REFERENCE TO RELATED APPLICATIONS

This application claims priority to and the benefit of Korean Patent Application No. 10-2018-0008943, filed on Jan. 24, 2018, and Korean Patent Application No. 10-2019-005689, filed on Jan. 16, 2019, the disclosures of which are incorporated herein by reference in their entirety.

TECHNICAL FIELD

The present invention relates to a thermoplastic resin composition, and particularly, to a thermoplastic resin composition which exhibits an improved elongation rate and improved surface quality so that it may be used as the outer panel material for coating a refrigerator and a washing machine.

BACKGROUND ART

The legal regulations for a conventional paint coating process including a curing process have been strengthened around the world due to an environmental pollution issue that the process causes, in which harmful substances such as volatile organic compounds are released into the atmosphere.

For this reason, polymer coated metal (PCM) steel sheets are currently commonly used as the outer panel material for household appliances for corrosion protection, friction reduction, and glossy appearance. In particular, the use of a vinyl coated metal (VCM) steel sheet which is coated with a vinyl resin among PCM materials is increasing in line with an increased demand for high-end final products. The VCM steel sheet is a material in which PVC and PET films are applied onto a zinc-plated steel sheet, and has been used as the outer panel material for household appliances. Further, the VCM steel sheet can be used for building and decorative materials, furniture, automobiles, electric materials, roof tiles, etc.

Currently, various coating materials for VCM are being developed. However, since the outer panel material coated with PVC and PET films exhibits inferior weather resistance, an ASA graft copolymer with excellent weather resistance may be an alternative. In the case of the ASA graft copolymer, an acrylic rubber-based polymer is mainly used in a core to enhance impact resistance, and styrene, acrylonitrile, methyl methacrylate, etc. are used in a shell to enhance colorability and dispersibility with a matrix copolymer.

In order to apply the ASA graft copolymer to VCM, the ASA graft copolymer needs to attain a high elongation rate for preventing tearing in a pressing process for sheet metal and exhibit excellent surface quality even when processed at high temperature.

Accordingly, efforts have been made to develop a thermoplastic resin composition including the ASA graft copolymer which exhibits no generation of air bubbles even when processed at high temperature and also has a high elongation rate.

DISCLOSURE

Technical Problem

The present invention is directed to providing a thermoplastic resin composition capable of forming a molded article for coating with a high elongation rate and excellent surface quality.

Technical Solution

According to an embodiment of the present invention, there is provided a thermoplastic resin composition which includes a first copolymer including an acrylic rubber-based graft copolymer and an emulsifier including a salt of a compound represented by Chemical Formula 1 below; a second copolymer including a unit derived from an alkyl acrylate-based monomer and a unit derived from an alkyl methacrylate-based monomer; and a third copolymer including a unit derived from an aromatic vinyl-based monomer and a unit derived from a vinyl cyan-based monomer:

<Chemical Formula 1>

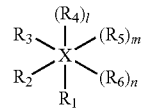

In Chemical Formula 1,

X represents a $C_1$ to $C_{10}$ trivalent or more aliphatic hydrocarbon or a $C_6$ to $C_{20}$ trivalent or more aromatic hydrocarbon, $R_1$ to $R_6$ each independently represent hydrogen, a $C_1$ to $C_{20}$ monovalent aliphatic hydrocarbon, or —$R_7$—COOH (where $R_7$ represents a direct bond or a $C_1$ to $C_{20}$ divalent aliphatic hydrocarbon), and two or more of $R_1$ to $R_6$ are —$R_7$—COOH, l, m, and n each independently represent 0 to 3.

According to another embodiment of the present invention, there is provided a method of preparing a thermoplastic resin composition, which includes preparing a first copolymer by adding an aromatic vinyl-based monomer, a vinyl cyan-based monomer, and an emulsifier including a salt of the compound represented by Chemical Formula 1 to an acrylic rubber-based polymer and performing graft polymerization; and mixing the first copolymer, a second copolymer including a unit derived from an alkyl acrylate-based monomer and a unit derived from an alkyl methacrylate-based monomer, and a third copolymer including a unit derived from an aromatic vinyl-based monomer and a unit derived from a vinyl cyan-based monomer.

Advantageous Effects

A thermoplastic resin composition according to the present invention exhibits a high elongation rate and minimizes the generation of gas caused by an emulsifier included in a graft copolymer, so that a molded article with excellent surface quality can be prepared. Accordingly, the thermoplastic resin composition can be applied as the outer panel material for a refrigerator and a washing machine.

MODE FOR INVENTION

Hereinafter, the present invention will be described in more detail to promote understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, an average particle size may be defined as a particle size corresponding to the average of the entire volume in the particle size distribution curve. In the present invention, an average particle size may be measured by laser diffraction particle size analysis.

In the present invention, a weight average molecular weight may be measured as a relative value with respect to standard polystyrene (PS) through gel permeation chromatography (GPC, Waters Breeze) using tetrahydrofuran (THF) as an elution solvent.

In the present invention, a weight ratio of monomer-derived units included in a second copolymer and a third copolymer may be measured as a relative value with respect to a reference substance through standard Fourier transform infrared (std. FT-IR). In this case, the reference substance includes the same constituents as those of the second and third copolymer, and refers to a substance whose weight ratio of the constituents is known.

In the present invention, a unit derived from an alkyl (meth)acrylate monomer may be one or more selected from the group consisting of a unit derived from an alkyl acrylate-based monomer and a unit derived from an alkyl methacrylate-based monomer. The unit derived from an alkyl acrylate-based monomer may be a unit derived from a $C_1$ to $C_{10}$ alkyl acrylate monomer. The unit derived from a $C_1$ to $C_{10}$ alkyl acrylate-based monomer may be a unit derived from one or more selected from the group consisting of methyl acrylate, ethyl acrylate, butyl acrylate, and ethylhexyl acrylate, and, in particular, a butyl acrylate-derived unit is preferred. The unit derived from an alkyl methacrylate-based monomer may be a unit derived from a $C_1$ to $C_{10}$ alkyl methacrylate-based monomer. The unit derived from a $C_1$ to $C_{10}$ alkyl methacrylate-based monomer may be a unit derived from one or more selected from the group consisting of methyl methacrylate, ethyl methacrylate, butyl methacrylate, and ethylhexyl methacrylate, and, in particular, a methyl methacrylate-derived unit is preferred.

In the present invention, a unit derived from an aromatic vinyl-based monomer may be a unit derived from one or more selected from the group consisting of styrene, α-methylstyrene, α-ethylstyrene, and p-methylstyrene, and, in particular, a styrene-derived unit is preferred.

In the present invention, a unit derived from a vinyl cyan-based monomer may be a unit derived from one or more selected from the group consisting of acrylonitrile, methacrylonitrile, phenyl acrylonitrile, and α-chloroacrylonitrile, and, in particular, an acrylonitrile-derived unit is preferred.

1. Thermoplastic Resin Composition

A thermoplastic resin composition according to an embodiment of the present invention includes 1) a first copolymer including an acrylic rubber-based graft copolymer and an emulsifier including a salt of a compound represented by Chemical Formula 1 below; 2) a second copolymer including a unit derived from an alkyl acrylate-based monomer and a unit derived from an alkyl methacrylate-based monomer; and 3) a third copolymer including a unit derived from an aromatic vinyl-based monomer and a unit derived from a vinyl cyan-based monomer:

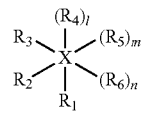
<Chemical Formula 1>

In Chemical Formula 1,

X represents a $C_1$ to $C_{10}$ trivalent or more aliphatic hydrocarbon or a $C_6$ to $C_{20}$ trivalent or more aromatic hydrocarbon, $R_1$ to $R_6$ each independently represent hydrogen, a $C_1$ to $C_{20}$ monovalent aliphatic hydrocarbon, or —$R_7$—COOH (where $R_7$ represents a direct bond or a $C_1$ to $C_{20}$ divalent aliphatic hydrocarbon), and two or more of $R_1$ to $R_6$ are —$R_7$—COOH, l, m, and n each independently represent 0 to 3.

Hereinafter, each constituent of the thermoplastic resin composition according to an embodiment of the present invention will be described in detail.

1) First Copolymer

The first copolymer includes an acrylic rubber-based graft copolymer and an emulsifier including a salt of a compound represented by Chemical Formula 1 below:

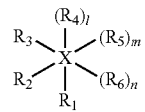
<Chemical Formula 1>

In Chemical Formula 1,

X represents a $C_1$ to $C_{10}$ trivalent or more aliphatic hydrocarbon or a $C_6$ to $C_{20}$ trivalent or more aromatic hydrocarbon, $R_1$ to $R_6$ each independently represent hydrogen, a $C_1$ to $C_{20}$ monovalent aliphatic hydrocarbon, or —$R_7$—COOH (where $R_7$ represents a direct bond or a $C_1$ to $C_{20}$ divalent aliphatic hydrocarbon), and two or more of $R_1$ to $R_6$ are —$R_7$—COOH, l, m, and n each independently represent 0 to 3.

The first copolymer may impart excellent weather resistance and a high elongation rate to the thermoplastic resin composition. Also, since the first copolymer is prepared using a salt of the compound represented by Chemical Formula 1 as an emulsifier, even when the thermoplastic resin composition is processed at high temperature, the generation of gas caused by the emulsifier is significantly reduced, and thus a molded article with excellent surface characteristics may be prepared.

The acrylic rubber-based graft copolymer may be prepared by adding an aromatic vinyl-based monomer, a vinyl cyan-based monomer, and an emulsifier including a salt of the compound represented by Chemical Formula 1 to an acrylic rubber-based polymer and performing graft polymerization.

In this case, the acrylic rubber-based polymer may be prepared by a method including preparing a seed by adding one or more selected from the group consisting of an alkyl (meth)acrylate monomer, an aromatic vinyl-based monomer, and a vinyl cyan-based monomer and performing polymerization; and, in the presence of the seed, preparing an acrylic rubber-based polymer by adding an alkyl (meth)acrylate monomer and performing polymerization.

The emulsifier may be the residue of the emulsifier added in the preparation of an acrylic rubber-based graft copolymer.

Since the emulsifier includes a salt of the compound represented by Chemical Formula 1, including two or more carboxylates, unlike a conventional fatty acid emulsifier, a copolymer with excellent latex stability may be prepared through emulsion polymerization.

In addition, even when the emulsifier is added in a smaller amount than that of a conventional emulsifier, polymerization may proceed smoothly. Also, since the emulsifier is added in a smaller amount than that of a conventional fatty acid emulsifier, degradation of impact resistance and surface quality, which is caused by a residual emulsifier, may be minimized.

Additionally, the emulsifier may have a higher weight average molecular weight than that of a conventional emulsifier, and thus exhibits low volatility at high temperature. Therefore, the generation of gas caused by a residual emulsifier when a copolymer is processed at high temperature using the emulsifier is significantly reduced, and thus a molded article with excellent surface characteristics may be prepared.

In Chemical Formula 1, X is preferably a $C_2$ to $C_7$ trivalent or more linear aliphatic hydrocarbon; a $C_3$ to $C_7$ trivalent or more branched aliphatic hydrocarbon; a $C_3$ to $C_{10}$ trivalent or more cyclic aliphatic hydrocarbon; or a $C_6$ to $C_{14}$ trivalent or more aromatic hydrocarbon. In this case, the aliphatic hydrocarbon may be a saturated or unsaturated aliphatic hydrocarbon.

The $C_2$ to $C_7$ trivalent or more linear aliphatic hydrocarbon or the $C_3$ to $C_7$ trivalent or more branched aliphatic hydrocarbon is more preferably represented by Chemical Formula 2 to Chemical Formula 4 below:

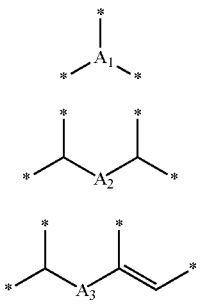

<Chemical Formula 2>

<Chemical Formula 3>

<Chemical Formula 4>

In Chemical Formula 2 to Chemical Formula 4, $A_1$ represents a $C_1$ to $C_4$ alkylene group, $A_2$ or $A_3$ each independently represents a direct bond or $C_1$ to $C_4$ alkylene group, and

* represents a binding site for $R_1$ to $R_6$ of Chemical Formula 1.

In this case, the direct bond refers to binding directly in the absence of $A_2$ or $A_3$.

The $C_3$ to $C_{10}$ trivalent or more cyclic aliphatic hydrocarbon is more preferably represented by any one selected from the group consisting of Chemical Formula 5 to Chemical Formula 7 below:

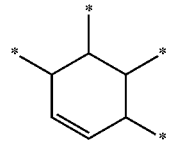

<Chemical Formula 5>

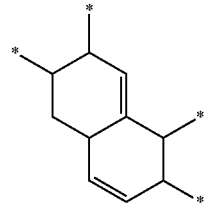

<Chemical Formula 6>

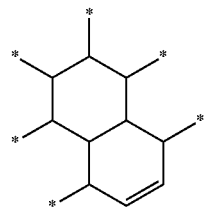

<Chemical Formula 7>

In Chemical Formula 5 to Chemical Formula 7,

* represents a binding site for $R_1$ to $R_6$ of Chemical Formula 1.

The $C_6$ to $C_{14}$ trivalent or more aromatic hydrocarbon is more preferably one or more selected from the group consisting of benzene, naphthalene, anthracene, and phenanthrene.

The emulsifier may be one or more selected from the group consisting of salts of compounds represented by Chemical Formula 8 to Chemical Formula 13 below:

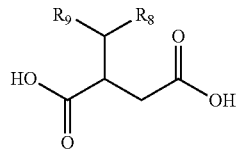

<Chemical Formula 8>

In Chemical Formula 8, $R_8$ and $R_9$ each independently represent hydrogen or a $C_{10}$ to $C_{20}$ linear or branched alkyl group or alkylene group, provided that $R_8$ and $R_9$ are not both hydrogen.

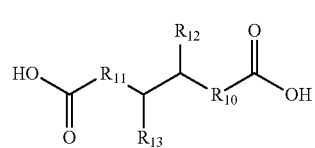

<Chemical Formula 9>

In Chemical Formula 9, $R_{10}$ and $R_{11}$ each independently represent a $C_2$ to $C_{10}$ linear alkylene group, a $C_3$ to $C_{10}$ branched alkylene group, or a $C_2$ to $C_{10}$ alkenylene group, and $R_{12}$ and $R_{13}$ each independently represent a $C_2$ to $C_{10}$ linear alkyl group, a $C_3$ to $C_{10}$ branched alkyl group, or a $C_2$ to $C_{10}$ alkenyl group.

<Chemical Formula 10>

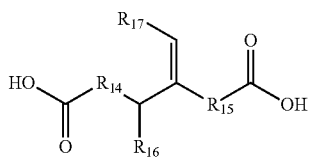

In Chemical Formula 10, $R_{14}$ and $R_{15}$ each independently represent a $C_2$ to $C_{10}$ linear alkylene group, a $C_3$ to $C_{10}$ branched alkylene group, or a $C_2$ to $C_{10}$ alkenylene group, and $R_{16}$ and $R_{17}$ each independently represent a $C_2$ to $C_{10}$ linear alkyl group, a $C_3$ to $C_{10}$ branched alkyl group, or a $C_2$ to $C_{10}$ alkenyl group.

<Chemical Fromula 11>

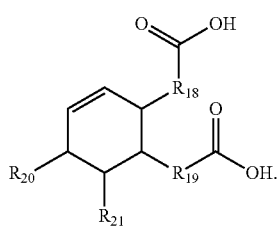

In Chemical Formula 11, $R_{18}$ and $R_{19}$ each independently represent a $C_2$ to $C_{10}$ linear alkylene group, a $C_3$ to $C_{10}$ branched alkylene group, or a $C_2$ to $C_{10}$ alkenylene group, and $R_{20}$ and $R_{21}$ each independently represent a $C_2$ to $C_{10}$ linear alkyl group, a $C_3$ to $C_{10}$ branched alkyl group, or a $C_2$ to $C_{10}$ alkenyl group.

<Chemical Formula 12>

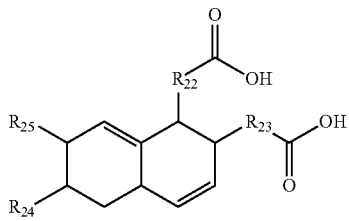

In Chemical Formula 12, $R_{22}$ and $R_{23}$ each independently represent a $C_2$ to $C_{10}$ linear alkylene group, a $C_3$ to $C_{10}$ branched alkylene group, or a $C_2$ to $C_{10}$ alkenylene group, and $R_{24}$ and $R_{25}$ each independently represent a $C_2$ to $C_{10}$ linear alkyl group, a $C_3$ to $C_{10}$ branched alkyl group, or a $C_2$ to $C_{10}$ alkenyl group.

<Chemical Formula 13>

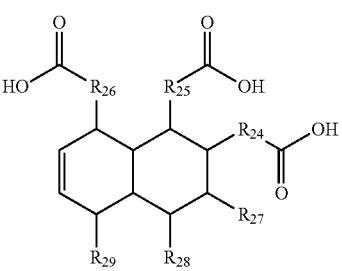

In Chemical Formula 13, $R_{24}$ to $R_{26}$ each independently represent a $C_2$ to $C_{10}$ linear alkylene group, a $C_3$ to $C_{10}$ branched alkylene group, or a $C_2$ to $C_{10}$ alkenylene group, and $R_{27}$ and $R_{28}$ each independently represent a $C_2$ to $C_{10}$ linear alkyl group, a $C_3$ to $C_{10}$ branched alkyl group, or a $C_2$ to $C_{10}$ alkenyl group.

The emulsifier may include salts of one or more selected from the group consisting of compounds represented by Chemical Formula 1-1 to Chemical Formula 1-13 below:

<Chemical Formula 1-1>

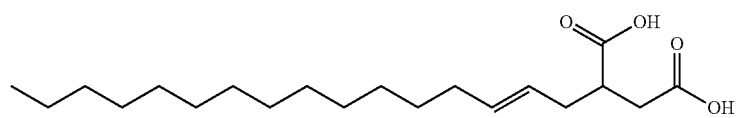

<Chemical Formula 1-2>

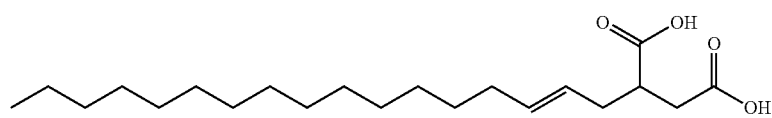

<Chemical Formula 1-3>

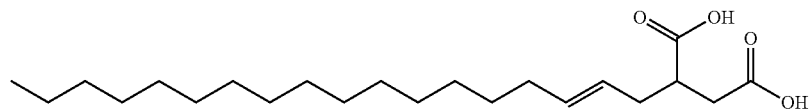

<Chemical Formula 1-4>

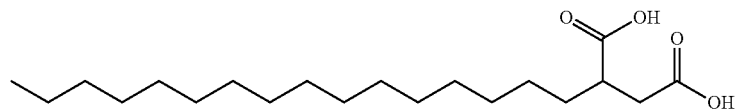

<Chemical Formula 1-5>
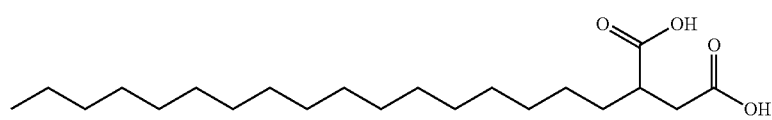
<Chemical Formula 1-6>
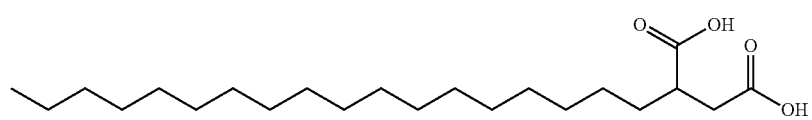
<Chemical Formula 1-7>
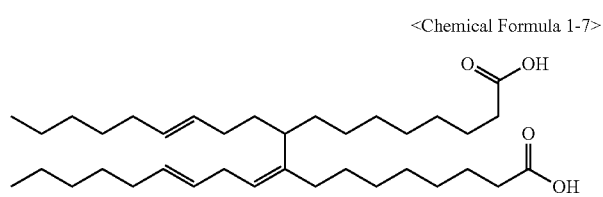
<Chemical Formula 1-8>
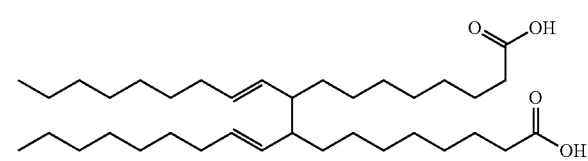
<Chemical Formula 1-9>
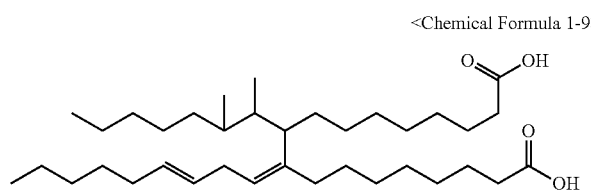
<Chemical Formula 1-10>
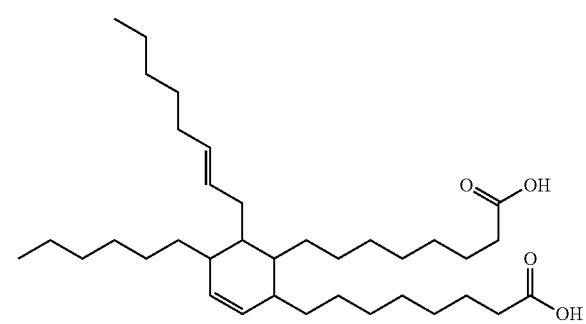
<Chemical Formula 1-11>
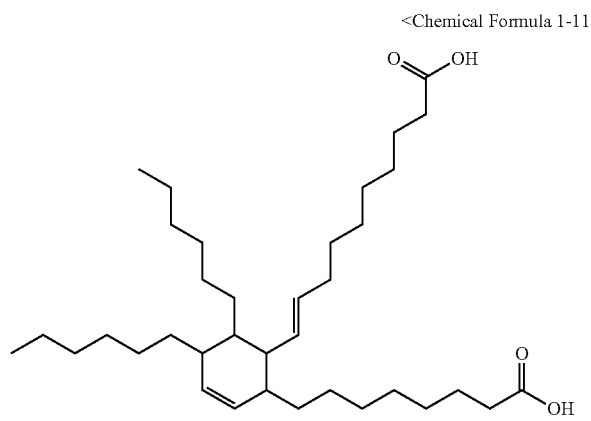
<Chemical Formula 1-12>
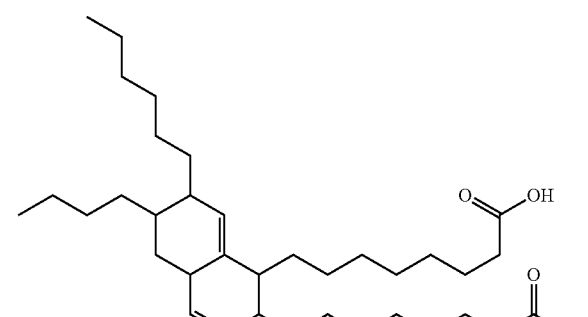

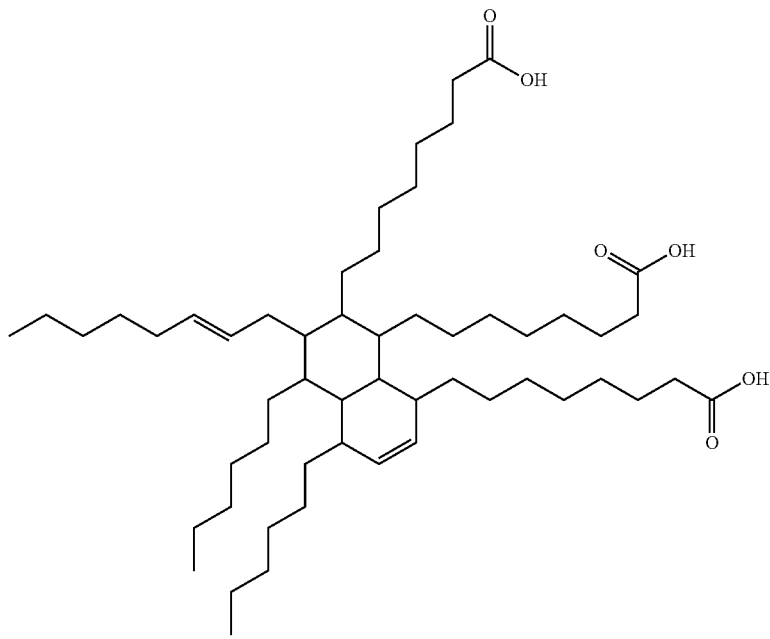

<Chemical Formula 1-13>

The emulsifier preferably includes salts of one or more selected from the group consisting of the compounds represented by Chemical Formula 1-1, Chemical Formula 1-2, Chemical Formula 1-3, Chemical Formula 1-7, Chemical Formula 1-10, and Chemical Formula 1-12.

Meanwhile, in the preparation process of the emulsifier, at least two types of salts of the compound represented by Chemical Formula 1 may be prepared, and one or more selected from the group consisting of salts of fatty acids having 45 to 60 carbon atoms and fatty acids having 18 or less carbon atoms may be prepared as by-products. Accordingly, the emulsifier may further include salts of one or more selected from the group consisting of fatty acids having 45 to 60 carbon atoms and fatty acids having 18 or less carbon atoms in addition to the salt of the compound represented by Chemical Formula 1.

The salt of the compound represented by Chemical Formula 1 may be an alkali metal salt, and is preferably a potassium salt or a sodium salt.

As the salt of the compound represented by Chemical Formula 1, commercially available products such as FS200 (trade name), ELOPLA AS100 (trade name), and ELOPLA AS200 (trade name) (LG Household & Health Care Ltd.) and Latemul ASK (trade name) (Kao Corporation) may be used.

The first copolymer may be included in an amount of 40 to 70 wt %, 45 to 65 wt %, or 50 to 60 wt % with respect to the total weight of the thermoplastic resin composition, and is preferably included in an amount of 50 to 60 wt %. When the content of the first copolymer falls within the above range, a high elongation rate may be imparted to a molded article formed of the thermoplastic resin composition, and the generation of gas may be minimized to improve surface quality.

2) Second Copolymer

The second copolymer includes a unit derived from an alkyl acrylate-based monomer and a unit derived from an alkyl methacrylate-based monomer.

The second copolymer has a synergistic effect with a third copolymer to be described below, and thus may improve an elongation rate of the thermoplastic resin composition. Also, since the second copolymer includes the unit derived from an alkyl acrylate-based monomer and the unit derived from an alkyl methacrylate-based monomer, excellent compatibility with the first copolymer may be exhibited.

A weight ratio of the unit derived from an alkyl acrylate-based monomer and the unit derived from an alkyl methacrylate-based monomer may be 20:80 to 80:20, 30:70 to 70:30, or 40:60 to 60:40, and is preferably 40:60 to 60:40. When the weight ratio thereof falls within the above range, processability, dispersibility, melting characteristics and trimmability may be excellent.

The second copolymer may have a weight average molecular weight of 500,000 to 2,000,000 g/mol, 700,000 to 1,500,000 g/mol, or 1,000,000 to 1,200,000 g/mol, and preferably has a weight average molecular weight of 1,000,000 to 1,200,000 g/mol. When the weight average molecular weight of the second copolymer falls within the above range, an elongation rate of a molded article formed of the thermoplastic resin composition may be further improved due to a significant difference in molecular weight between the second copolymer and a third copolymer.

The second copolymer may be prepared by polymerizing an alkyl acrylate-based monomer and an alkyl methacrylate-based monomer through one or more methods selected from the group consisting of emulsion polymerization, suspension polymerization, and bulk polymerization, and, in particular, emulsion polymerization is preferably used.

The second copolymer may be directly prepared or may be a commercially available product.

The second copolymer may be included in an amount of 1 to 25 wt %, 3 to 20 wt %, or 5 to 15 wt % with respect to the total weight of the thermoplastic resin composition, and is preferably included in an amount of 5 to 15 wt %. When the content of the second copolymer falls within the above range, the thermoplastic resin composition exhibits excellent fluidity, and thus processability may be further improved.

Also, compatibility of the second copolymer with the first copolymer and the third copolymer may be further improved.

3) Third Copolymer

The third copolymer includes a unit derived from an aromatic vinyl-based monomer and a unit derived from a vinyl cyan-based monomer.

The third copolymer may be included to improve balance among properties, that is, mechanical properties, fluidity, and heat resistance, of the thermoplastic resin composition. In addition, the third copolymer and the second copolymer may create a synergistic effect in improving an elongation rate of the thermoplastic resin composition. Additionally, the third copolymer may improve surface characteristics of the thermoplastic resin composition. In addition, since the third copolymer includes the unit derived from an aromatic vinyl-based monomer and the unit derived from a vinyl cyan-based monomer, excellent compatibility with the first copolymer may be exhibited.

The third copolymer may include the unit derived from an aromatic vinyl-based monomer and the unit derived from a vinyl cyan-based monomer in a weight ratio of 80:20 to 60:40, 75:25 to 65:35, or 73:27 to 68:32, preferably in a weight ratio of 73:27 to 68:32. When the weight ratio of the unit derived from an aromatic vinyl-based monomer and the unit derived from a vinyl cyan-based monomer falls within the above range, the balance among mechanical properties, fluidity, and heat resistance may be improved.

The third copolymer may have a weight average molecular weight of 20,000 to 100,000 g/mol or 40,000 to 80,000 g/mol, and preferably has a weight average molecular weight of 40,000 to 80,000 g/mol. When the weight average molecular weight of the third copolymer falls within the above range, the balance among mechanical properties, fluidity, and heat resistance may be improved. In addition, an elongation rate of a molded article formed of the thermoplastic resin composition may be further improved due to a significant difference in molecular weight between the third copolymer and the second copolymer.

The third copolymer may be prepared by polymerizing an aromatic vinyl-based monomer and a vinyl cyan-based monomer through one or more methods selected from the group consisting of emulsion polymerization, suspension polymerization, and bulk polymerization, and, in particular, bulk polymerization is preferably used.

The third copolymer may be a copolymer prepared by performing bulk polymerization using a polymerization initiator whose 1-hour half-life temperature is 5 to 25° C. lower than a polymerization temperature and then performing primary devolatilization under conditions of a temperature of 150 to 160° C. and a pressure of 400 Torr or less and secondary devolatilization under conditions of a temperature of 230 to 250° C. and a pressure of 20 Torr or less.

Since the third copolymer is prepared under the above-described conditions, the amount of an oligomer formed in the copolymer is minimized, and accordingly, the generation of gas caused by the oligomer during molding of the thermoplastic resin composition may be minimized.

The third copolymer may be directly prepared or may be a commercially available product.

The third copolymer may be included in an amount of 25 to 55 wt %, 30 to 50 wt %, or 35 to 45 wt % with respect to the total weight of the thermoplastic resin composition, and is preferably included in an amount of 35 to 45 wt %. When the content of the third copolymer falls within the above range, a high elongation rate may be imparted to a molded article formed of the thermoplastic resin composition.

2. Method of Preparing Thermoplastic Resin Composition

A method of preparing a thermoplastic resin composition according to an embodiment of the present invention includes 1) preparing a first copolymer by adding an aromatic vinyl-based monomer, a vinyl cyan-based monomer, and an emulsifier including a salt of a compound represented by Chemical Formula 1 below to an acrylic rubber-based polymer and performing graft polymerization; and 2) mixing the first copolymer, a second copolymer including a unit derived from an alkyl acrylate-based monomer and a unit derived from an alkyl methacrylate-based monomer, and a third copolymer including a unit derived from an aromatic vinyl-based monomer and a unit derived from a vinyl cyan-based monomer.

Hereinafter, the method of preparing a thermoplastic resin composition will be described in detail.

1) Step of Preparing a First Copolymer

First, an aromatic vinyl-based monomer, a vinyl cyan-based monomer, and an emulsifier including a salt of the compound represented by Chemical Formula 1 are added to an acrylic rubber-based polymer and graft polymerization is performed to prepare a first copolymer.

Specifically, the step of preparing a first copolymer includes (i) preparing a seed by adding one or more selected from the group consisting of an aromatic vinyl-based monomer, a vinyl cyan-based monomer, and an alkyl (meth) acrylate monomer and performing polymerization, and, in the presence of the seed, preparing an acrylic rubber-based polymer by adding an alkyl (meth)acrylate monomer and performing polymerization, and, (ii) in presence of the acrylic rubber-based polymer, preparing a shell by adding an aromatic vinyl-based monomer, a vinyl cyan-based monomer, and an emulsifier including a salt of the compound represented by Chemical Formula 1 and performing polymerization.

The monomers added in the preparation of a seed may be included in an amount of 4 to 20 wt %, 4 to 15 wt %, or 4 to 10 wt % with respect to the total weight of monomers added in the preparation of a first copolymer, and is preferably included in an amount of 4 to 10 wt %. When the content of the monomers added in the preparation of a seed falls within the above range, a first copolymer with excellent impact resistance, excellent weather resistance, and well-balanced physical properties may be prepared.

The polymerization in the preparation of a seed may be emulsion polymerization, and may specifically be a cross-linking reaction.

In the preparation of a seed, one or more selected from the group consisting of an initiator, an emulsifier, a crosslinking agent, a grafting agent, an electrolyte, and water may be further added.

The initiator may be a radical initiator. The initiator may be one or more selected from the group consisting of sodium persulfate, potassium persulfate, ammonium persulfate, potassium perphosphate, hydrogen peroxide, t-butyl peroxide, t-butyl hydroperoxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butylperoxy isobutyrate, azobis(isobutyronitrile), azobis-2,4-dimethylvaleronitrile, azobis(cyclohexanecarbonitrile), and azobis(methyl isobutyrate).

The emulsifier may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, sodium dodecyl sulfate, sodium dodecylbenzene sulfate, sodium octadecyl sulfate, sodium oleic sulfate, potassium dodecyl sulfate, potassium octadecyl sulfate, potassium rosinate, and sodium rosinate.

The crosslinking agent may be one or more selected from the group consisting of ethylene glycol di(meth)acrylate, polyethylene glycol di(meth)acrylate, polypropylene glycol di(meth)acrylate, divinylbenzene, diethylene glycol di(meth)acrylate, triethylene glycol di(meth)acrylate, 1,3-butadiol dimethacrylate, hexanediol ethoxylate diacrylate, hexanediol propoxylate di(meth)acrylate, neopentyl glycol dimethacrylate, neopentyl glycol ethoxylate di(meth)acrylate, neopentyl glycol propoxylate di(meth)acrylate, trimethylolmethane tri(meth)acrylate, trimethylolpropane tri(meth)acrylate, trimethylpropane ethoxylate tri(meth)acrylate, trimethylpropane propoxylate tri(meth)acrylate, pentaerythritol ethoxylate tri(meth)acrylate, pentaerythritol propoxylate tri(meth)acrylate, and vinyltrimethoxysilane.

The grafting agent may be one or more selected from the group consisting of allyl methacrylate, triallyl isocyanurate, diallylamine, and triallylamine.

The electrolyte may be one or more selected from the group consisting of KCl, NaCl, $KHCO_3$, $NaHCO_3$, $K_2CO_3$, $Na_2CO_3$, $KHSO_3$, $NaHSO_4$, $Na_2S_2O_7$, $K_4P_2O_7$, $K_3PO_4$, $Na_3PO_4$ or $Na_2HPO_4$, KOH, and NaOH.

The water may be distilled water or ion exchanged water.

The seed may have an average particle size of 100 to 300 nm or 150 to 250 nm, and preferably has an average particle size of 150 to 250 nm. When the average particle size of the seed falls within the above range, mechanical properties and appearance characteristics of a molded article formed of the first copolymer may be further improved.

The monomer added in the preparation of an acrylic rubber-based polymer may be included in an amount of 30 to 60 wt %, 35 to 55 wt %, or 40 to 50 wt % with respect to the total weight of monomers added in the preparation of the first copolymer, and is preferably included in an amount of 40 to 50 wt %. When the content of the monomer added in the preparation of an acrylic rubber-based polymer falls within the above range, impact resistance, weather resistance, dispersibility, and an elongation rate of the thermoplastic resin composition may be further improved.

The polymerization in the preparation of an acrylic rubber-based polymer may be emulsion polymerization, and may specifically be a crosslinking reaction.

In the preparation of an acrylic rubber-based polymer, one or more selected from the group consisting of an emulsifier, an initiator, a crosslinking agent, a grafting agent, and water may be further added.

Types of the emulsifier, the initiator, the crosslinking agent, the grafting agent, the water are the same as described above.

The average particle size of the acrylic rubber-based polymer may be larger than that of the seed, and may be 250 to 500 nm or 300 to 450 nm, and is preferably 300 to 450 nm. When the average particle size of the acrylic rubber-based polymer falls within the above range, mechanical properties, weather resistance, and an elongation rate of a molded article formed of the first copolymer may be further improved.

The monomers added in the preparation of a shell may be included in an amount of 30 to 60 wt %, 35 to 55 wt %, or 40 to 50 wt % with respect to the total weight of monomers added in the preparation of a first copolymer, and is preferably included in an amount of 40 to 50 wt %. When the content of the monomers added in the preparation of a shell falls within the above range, mechanical properties and appearance characteristics of the first copolymer may be further improved.

A weight ratio of the aromatic vinyl-based monomer and the vinyl cyan-based monomer which are added in the preparation of a shell may be 80:20 to 65:35 or 75:25 to 70:30, and is preferably 75:25 to 70:30. When the weight ratio of the aromatic vinyl-based monomer and the vinyl cyan-based monomer falls within the above range, surface characteristics, impact resistance, and chemical resistance of a molded article formed of the thermoplastic resin composition may be further improved. Also, dispersibility of the first copolymer in the thermoplastic resin composition may be further improved.

The emulsifier including a salt of the compound represented by Chemical Formula 1, which is added in the preparation of a shell, may be included in an amount of 0.1 to 2.0 parts by weight, 0.15 to 1.0 part by weight, or 0.2 to 0.8 part by weight with respect to 100 parts by weight of the sum of monomers added in the preparation of a first copolymer, and is preferably included in an amount of 0.2 to 0.8 part by weight. When the content of the emulsifier falls within the above range, the amount of gas generated when the thermoplastic resin composition is processed at high temperature may be minimized to minimize the generation of air bubbles. Therefore, a molded article with excellent surface characteristics, specifically, with no air bubble marks at the surface thereof may be prepared, and accordingly, it may be applied as the outer panel material for a refrigerator and a washing machine.

The polymerization in the preparation of a shell may be emulsion polymerization, and may specifically be graft polymerization.

In the preparation of a shell, one or more selected from the group consisting of an initiator, a molecular weight controlling agent, and water may be further added.

The molecular weight controlling agent may be one or more selected from the group consisting of α-methylstyrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropyl xanthogen disulfide.

Types of the initiator and water are the same as described above.

Meanwhile, the monomers added in the preparation of a first copolymer refer to the alkyl (meth)acrylate monomer, the aromatic vinyl-based monomer, and the vinyl cyan-based monomer.

The average particle size of the first copolymer may be larger than that of the acrylic rubber-based polymer, and may be 400 to 600 nm or 450 to 550 nm, and is preferably 450 to 550 nm. When the average particle size of the first copolymer falls within the above range, excellent latex stability may be exhibited, and mechanical properties and appearance characteristics of the first copolymer may be further improved.

The step of preparing a first copolymer may further include a pulverization process including coagulating, aging, washing, dehydration, and drying processes.

2) Step of Preparing Thermoplastic Resin Composition

Subsequently, the first copolymer, a second copolymer including a unit derived from an alkyl acrylate-based monomer and a unit derived from an alkyl methacrylate-based monomer, and a third copolymer including a unit derived from an aromatic vinyl-based monomer and a unit derived from a vinyl cyan-based monomer are mixed to prepare a thermoplastic resin composition.

In this case, descriptions of the second copolymer and the third copolymer are the same as described above.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1

<Preparation of Seed>

10 parts by weight of butyl acrylate, 0.03 part by weight of sodium dodecyl sulfate as an emulsifier, 0.05 part by weight of ethylene glycol dimethacrylate as a crosslinking agent, 0.05 part by weight of allyl methacrylate as a grafting agent, and 40 parts by weight of distilled water were batch-added to a nitrogen-substituted reactor, and the temperature inside the reactor was raised to 70° C. Afterward, 0.1 part by weight of potassium persulfate was added as an initiator to initiate polymerization, and the polymerization was performed for 1 hour, thereby obtaining a seed having an average particle size of 200 nm.

<Preparation of Acrylic Rubber-Based Polymer>

In the presence of the seed thus obtained, a mixture including 50 parts by weight of butyl acrylate, 0.6 part by weight of sodium dodecyl sulfate as an emulsifier, 0.3 part by weight of ethylene glycol dimethacrylate as a crosslinking agent, 0.5 part by weight of allyl methacrylate as a grafting agent, 30 parts by weight of distilled water, and 0.05 part by weight of potassium persulfate as an initiator was prepared.

Polymerization was performed while continuously adding the mixture to a nitrogen-substituted reactor set to 70° C. for 3 hours. After the addition was terminated, polymerization was further performed for another 1 hour and terminated, thereby obtaining an acrylic rubber-based polymer having an average particle size of 400 nm.

<Preparation of Shell>

In the presence of the acrylic rubber-based polymer thus obtained, a mixture including 29.2 parts by weight of styrene, 10.8 parts by weight of acrylonitrile, 25 parts by weight of distilled water, 0.8 part by weight of FS200 (trade name, manufacturer: LG Household & Health Care Ltd., constituents include a salt of the compound represented by Chemical Formula 1-7, a salt of the compound represented by Chemical Formula 1-10, and a salt of the compound represented by Chemical Formula 1-12) as an emulsifier, 0.1 part by weight of t-dodecyl mercaptan as a molecular weight controlling agent, and 0.25 part by weight of potassium persulfate as an initiator was prepared.

Polymerization was performed while continuously adding the mixture to a nitrogen-substituted reactor set to 75° C. for 2 hours. After the addition was terminated, polymerization was further performed for another 1 hour, the temperature inside the reactor was cooled to 60° C., and the polymerization was then terminated, thereby preparing a shell. As a result, a graft copolymer latex having an average particle size of 500 nm was obtained.

<Preparation of Graft Copolymer Powder>

Calcium chloride as a flocculating agent was mixed with the graft copolymer latex thus obtained, and the mixture was coagulated at 80° C. and atmospheric pressure for 5 minutes, aged at 95° C. for 5 minutes, dehydrated, washed, and then dried with a 90° C. hot air for 30 minutes, thereby preparing an ASA graft copolymer powder.

Preparation Example 2

An ASA graft copolymer powder was prepared in the same manner as in Preparation Example 1 except that ELOPLA AS200 (trade name, manufacturer: LG Household & Health Care Ltd., constituents include water, a potassium salt of the compound represented by Chemical Formula 1-1, a potassium salt of the compound represented by Chemical Formula 1-2, and a potassium salt of the compound represented by Chemical Formula 1-3) was used instead of FS200 as an emulsifier in the preparation of a shell.

Preparation Example 3

An ASA graft copolymer powder was prepared in the same manner as in Preparation Example 1 except that sodium dodecyl sulfate was used instead of FS200 as an emulsifier in the preparation of a shell.

Preparation Example 4

50 parts by weight of butyl acrylate and 50 parts by weight of methyl methacrylate were subjected to emulsion polymerization, thereby preparing an acrylic copolymer having a weight average molecular weight of 1,000,000 g/mol.

Preparation Example 5

A mixed solution was prepared by mixing 20 wt % of toluene, 56 wt % of styrene, and 24 wt % of acrylonitrile. 0.03 part by weight of 1,1-bis(t-butylperoxy)cyclohexane and 0.1 part by weight of t-dodecyl mercaptan were added to 100 parts by weight of the mixed solution thus prepared, and polymerization was then performed at 130° C. while putting the mixture into a 26 L polymerization reactor at a predetermined rate of 10 kg/hr, thereby preparing a polymerization product. The polymerization product thus prepared was transferred to a devolatilizer, and an unreacted monomer and a reaction solvent were recovered and removed at a temperature of 235° C. and a pressure of 15 Torr, thereby preparing a pellet-type SAN copolymer. Here, the SAN copolymer had a weight average molecular weight of 80,000 g/mol.

EXAMPLES AND COMPARATIVE EXAMPLES

The specifications of components used in Examples and Comparative Examples below are as follows.

(A) Graft copolymer:

(A-1): The ASA graft copolymer powder prepared according to Preparation Example 1 was used.

(A-2): The ASA graft copolymer powder prepared according to Preparation Example 2 was used.

(A-3): The ASA graft copolymer powder prepared according to Preparation Example 3 was used.

(B) Acrylic copolymer: The acrylic copolymer prepared according to Preparation Example 4 was used.

(C) SAN copolymer (C-1): The SAN copolymer prepared according to Preparation Example 5 was used.

(C-2): 90HR manufactured by LG Chem Ltd. (a styrene/acrylonitrile copolymer; a weight average molecular weight: 150,000 g/mol) was used.

(D) Acrylic polymer: IH830 manufactured by LG MMA (polymethyl methacrylate, a weight average molecular weight: 200,000 g/mol) was used.

The components (A) to (D) were mixed in contents as listed in Table 1 and Table 2 below and stirred to prepare a thermoplastic resin composition.

Experimental Example

Each of the thermoplastic resin compositions according to Examples and Comparative Examples was put into a twin screw extruder set to 220° C. and extruded to prepare a pellet, and the pellet was injected to prepare a specimen.

Properties of the specimen were evaluated by methods as described below, and results thereof are shown in Table 1 and Table 2 below.

(1) Impact strength (kg·cm/cm): measured in accordance with ASTM 256 using the specimen whose thickness was adjusted to ⅛ inch.

(2) Tensile strength (kg/cm$^2$): measured using the specimen in accordance with ASTM D638.

(3) Elongation rate (%): measured using the specimen in accordance with ASTM D638.

(4) Flexural strength (kg/cm$^2$): measured using the specimen in accordance with ASTM D790.

(5) Surface quality: A surface of the specimen was observed through visual observation. A case where there was no air bubble generation was evaluated as "Good", and a case where there was air bubble generation was evaluated as "Poor".

TABLE 1

| Classification | | Examples | | | | | |
|---|---|---|---|---|---|---|---|
| | | 1 | 2 | 3 | 4 | 5 | 6 |
| (A) Graft copolymer (parts by weight) | (A-1) | 60 | 50 | 50 | 35 | 55 | — |
| | (A-2) | — | — | — | — | — | 60 |
| | (A-3) | — | — | — | — | — | — |
| (B) Acrylic copolymer (parts by weight) | | 5 | 5 | 15 | 30 | 15 | 5 |
| (C) SAN copolymer (parts by weight) | (C-1) | 35 | 45 | 35 | 35 | 30 | 35 |
| | (C-2) | — | — | — | — | — | — |
| (D) Acrylic polymer (parts by weight) | | — | — | — | — | — | — |
| Impact strength | | 35 | 30 | 31 | 23 | 33 | 33 |
| Tensile strength | | 355 | 410 | 415 | 430 | 370 | 345 |
| Elongation rate | | 152 | 93 | 74 | 92 | 151 | 139 |
| Flexural strength | | 480 | 505 | 500 | 515 | 490 | 475 |
| Surface quality | | Good | Good | Good | Good | Good | Good |

TABLE 2

| Classification | | Comparative Example | | | | | | | |
|---|---|---|---|---|---|---|---|---|---|
| | | 1 | 2 | 3 | 4 | 5 | 6 | 7 | 8 |
| (A) Graft copolymer (parts by weight) | (A-1) | — | — | — | — | 60 | 60 | — | 50 |
| | (A-2) | — | — | — | — | — | — | — | — |
| | (A-3) | 60 | 60 | 35 | 55 | — | — | 60 | — |
| (B) Acrylic copolymer (parts by weight) | | — | 10 | 30 | — | — | 40 | 5 | — |
| (C) SAN copolymer (parts by weight) | (C-1) | — | — | — | — | 40 | — | 35 | 35 |
| | (C-2) | 40 | 30 | 35 | 45 | — | — | — | — |
| (D) Acrylic polymer (parts by weight) | | — | — | — | — | — | — | — | 15 |
| Impact strength | | 35 | 37 | 19 | 28 | 34 | 46 | 32 | 18 |
| Tensile strength | | 345 | 350 | 360 | 355 | 350 | 110 | 340 | 430 |
| Elongation rate | | 58 | 82 | 77 | 39 | 50 | 246 | 141 | 38 |
| Flexural strength | | 480 | 485 | 505 | 480 | 475 | 125 | 450 | 520 |
| Surface quality | | Poor | Poor | Poor | Poor | Poor | Poor | Poor | Good |

Referring to Table 1 and Table 2, it can be confirmed that Example 1 to Example 6 were excellent in tensile strength, an elongation rate, flexural strength, and surface quality. In particular, in the case of Example 1 to Example 3, Example 5, and Example 6, impact strength as well as tensile strength, an elongation rate, flexural strength, and surface quality was excellent because appropriate amounts of first to third copolymers were included.

Comparative Example 1 and Comparative Example 4, in which a first copolymer and a second copolymer were not included, exhibited poor surface quality and a low elongation rate. Comparative Example 2 and Comparative Example 3, in which a first copolymer was not included, exhibited poor surface quality. Comparative Example 5, in which a second copolymer was not included, exhibited poor surface quality and a significantly degraded elongation rate. Comparative Example 6, in which a third copolymer was not included, exhibited poor surface quality and an excessively increased elongation rate. Comparative Example 7, in which a first copolymer was not included, exhibited poor surface quality. Also, it can be confirmed that Comparative Example 8, in which polymethyl methacrylate was included instead of a second copolymer, exhibited significant degradation of impact strength and an elongation rate compared to Example 3.

The invention claimed is:

1. A thermoplastic resin composition comprising:
   a first copolymer including an acrylic rubber-based graft copolymer and an emulsifier including a salt of a compound represented by Chemical Formula 1 below;
   a second copolymer including a unit derived from an alkyl acrylate-based monomer and a unit derived from an alkyl methacrylate-based monomer; and a third copolymer including a unit derived from an aromatic vinyl-based monomer and a unit derived from a vinyl cyan-based monomer:

<Chemical Formula 1>

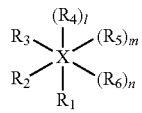

wherein X represents a $C_1$ to $C_{10}$ trivalent or more aliphatic hydrocarbon or a $C_6$ to $C_{20}$ trivalent or more aromatic hydrocarbon, $R_1$ to $R_6$ each independently represent hydrogen, a $C_1$ to $C_{20}$ monovalent aliphatic hydrocarbon, or —$R_7$—COOH (where $R_7$ represents a direct bond or a $C_1$ to $C_{20}$ divalent aliphatic hydrocarbon), and two or more of $R_1$ to $R_6$ are —$R_7$—COOH, l, m, and n each independently represent 0 to 3, wherein the second copolymer has a weight average molecular weight of 500,000 to 2,000,000 g/mol.

2. The thermoplastic resin composition of claim 1, wherein X represents a $C_2$ to $C_7$ trivalent or more linear aliphatic hydrocarbon; a $C_3$ to $C_7$ trivalent or more branched aliphatic hydrocarbon; a $C_3$ to $C_{10}$ trivalent or more cyclic aliphatic hydrocarbon; or a $C_6$ to $C_{14}$ trivalent or more aromatic hydrocarbon.

3. The thermoplastic resin composition of claim 2, wherein the $C_2$ to $C_7$ trivalent or more linear aliphatic hydrocarbon or the $C_3$ to $C_7$ trivalent or more branched aliphatic hydrocarbon is represented by one or more selected from the group consisting of Chemical Formula 2 to Chemical Formula 4 below, the $C_3$ to $C_{10}$ trivalent or more cyclic aliphatic hydrocarbon is represented by one or more selected from the group consisting of Chemical Formula 5 to Chemical Formula 7 below, and the $C_6$ to $C_{14}$ trivalent or more aromatic hydrocarbon is one or more selected from the group consisting of benzene, naphthalene, anthracene, and phenanthrene:

<Chemical Formula 2>

<Chemical Formula 3>

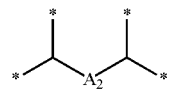

<Chemical Formula 4>

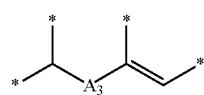

<Chemical Formula 5>

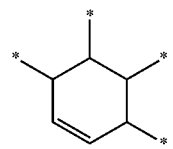

<Chemical Formula 6>

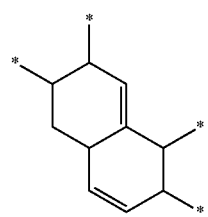

<Chemical Formula 7>

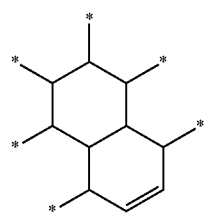

wherein $A_1$ represents a $C_1$ to $C_4$ alkylene group, $A_2$ or $A_3$ each independently represents a direct bond or a $C_1$ to $C_4$ alkylene group, and

* represents a binding site for $R_1$ to $R_6$ of Chemical Formula 1.

4. The thermoplastic resin composition of claim 1, wherein the emulsifier includes salts of one or more selected from the group consisting of compounds represented by Chemical Formula 1-1 to Chemical Formula 1-13 below:

<Chemical Formula 1-1>

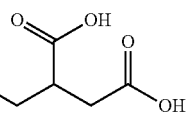

<Chemical Formula 1-2>

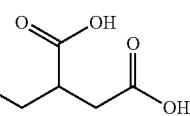

<Chemical Formula 1-3>

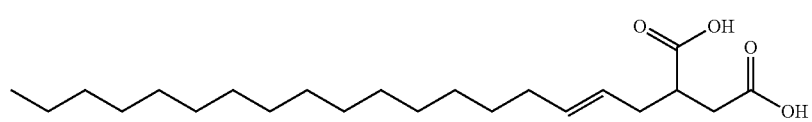

-continued
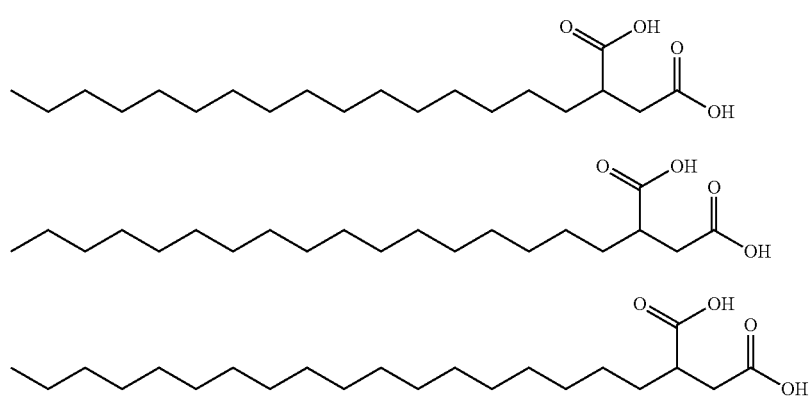
<Chemical Formula 1-4>
<Chemical Formula 1-5>
<Chemical Formula 1-6>
<Chemical Formula 1-7>    <Chemical Formula 1-8>
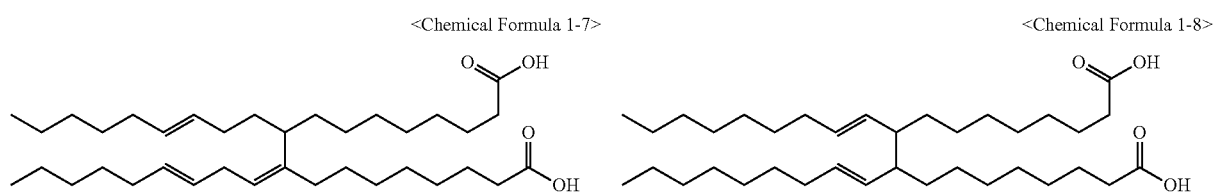
<Chemical Formula 1-9>    <Chemical Formula 1-10>
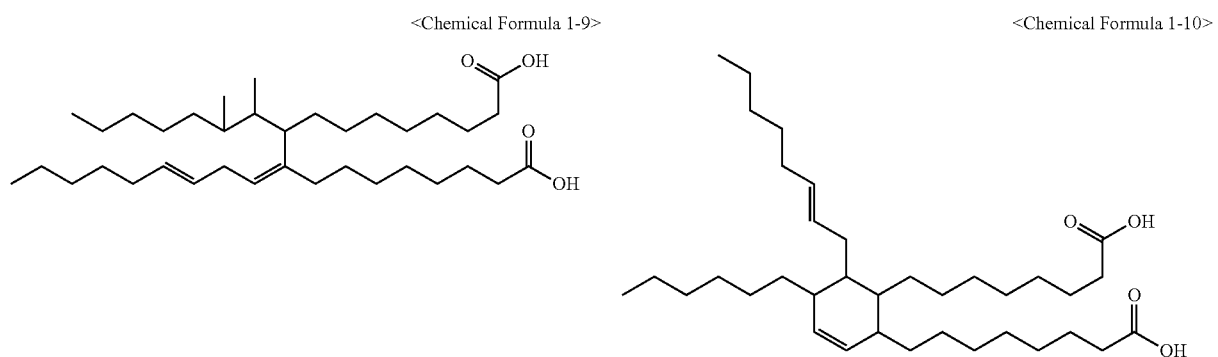
<Chemical Formula 1-11>    <Chemical Formula 1-12>
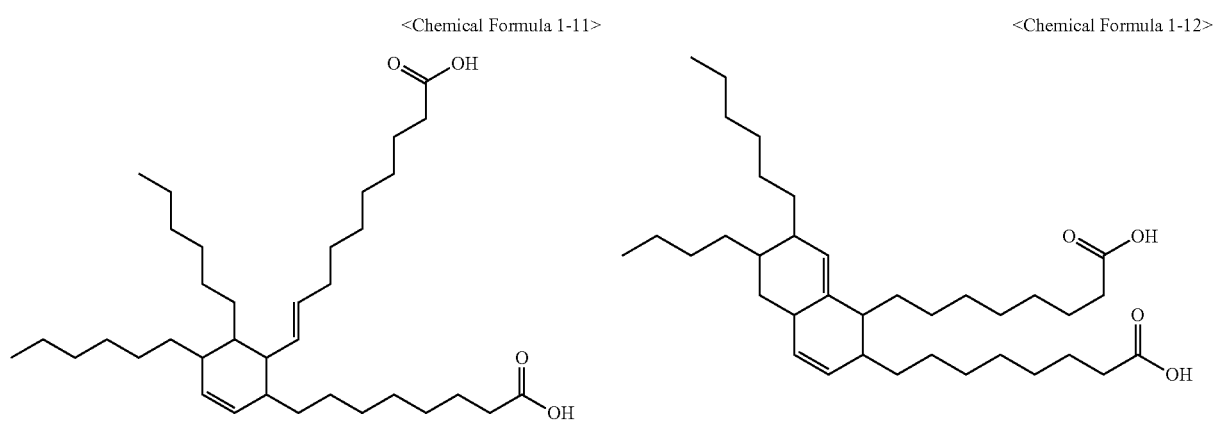

-continued

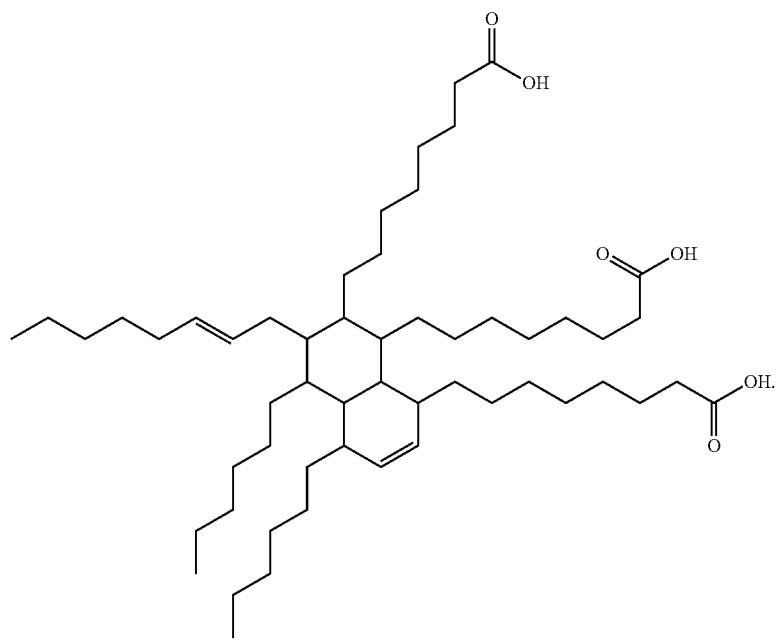

5. The thermoplastic resin composition of claim 1, wherein the emulsifier includes salts of one or more selected from the group consisting of compounds represented by Chemical Formula 1-1, Chemical Formula 1-2, Chemical Formula 1-3, Chemical Formula 1-7, Chemical Formula 1-10, and Chemical Formula 1-12 below:

<Chemical Formula 1-1>

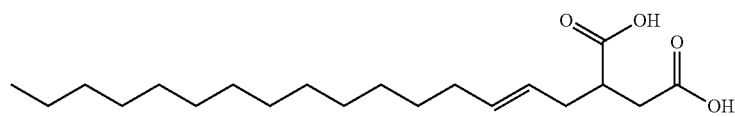

<Chemical Formula 1-2>

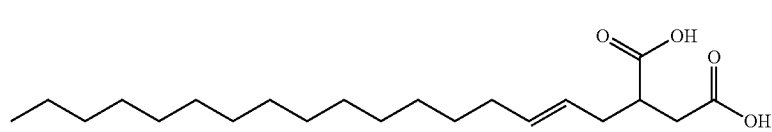

<Chemical Formula 1-3>

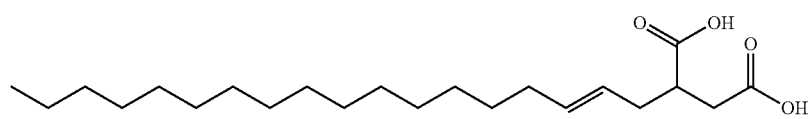

<Chemical Formula 1-7>

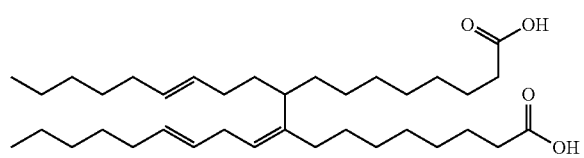

<Chemical Formula 1-10>

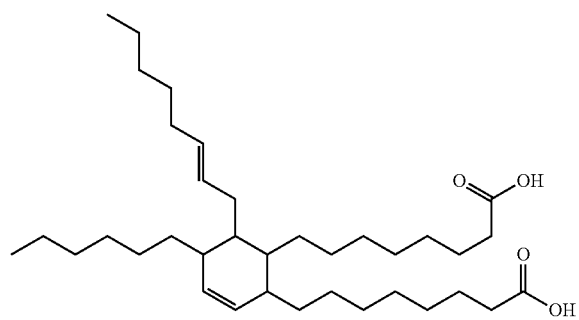

-continued

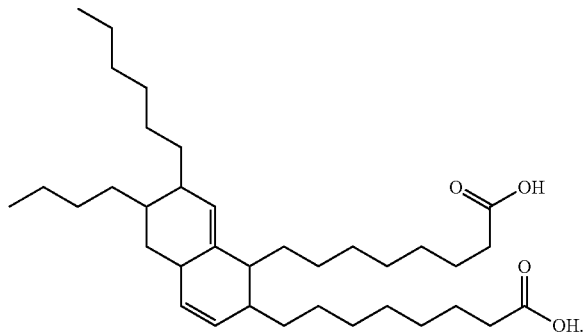

<Chemical Formula 1-12>

6. The thermoplastic resin composition of claim 1, wherein the second copolymer includes the unit derived from an alkyl acrylate-based monomer and the unit derived from an alkyl methacrylate-based monomer in a weight ratio of 20:80 to 80:20.

7. The thermoplastic resin composition of claim 1, wherein the third copolymer includes the unit derived from an aromatic vinyl-based monomer and the unit derived from a vinyl cyan-based monomer in a weight ratio of 80:20 to 60:40.

8. The thermoplastic resin composition of claim 1, wherein the third copolymer has a weight average molecular weight of 20,000 to 100,000 g/mol.

9. The thermoplastic resin composition of claim 1, wherein the thermoplastic resin composition includes, with respect to the total weight thereof,
- 40 to 70 wt % of the first copolymer;
- 1 to 25 wt % of the second copolymer; and
- 25 to 55 wt % of the third copolymer.

10. A method of preparing a thermoplastic resin composition, comprising:
preparing a first copolymer by adding an aromatic vinyl-based monomer, a vinyl cyan-based monomer, and an emulsifier including a salt of a compound represented by Chemical Formula 1 below to an acrylic rubber-based polymer and performing graft polymerization; and
mixing the first copolymer, a second copolymer including a unit derived from an alkyl acrylate-based monomer and a unit derived from an alkyl methacrylate-based monomer, and a third copolymer including a unit derived from an aromatic vinyl-based monomer and a unit derived from a vinyl cyan-based monomer:

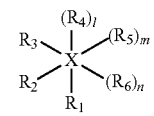

<Chemical Formula 1> wherein X represents a $C_1$ to $C_{10}$ trivalent or more aliphatic hydrocarbon or a $C_6$ to $C_{20}$ trivalent or more aromatic hydrocarbon, $R_1$ to $R_6$ each independently represent hydrogen, a $C_1$ to $C_{20}$ monovalent aliphatic hydrocarbon, or —$R_7$—COOH (where $R_7$ represents a direct bond or a $C_1$ to $C_{20}$ divalent aliphatic hydrocarbon), and two or more of $R_1$ to $R_6$ are —$R_7$—COOH, l, m, and n each independently represent 0 to 3, wherein the step of preparing a first copolymer comprises:
(i) preparing a seed by adding one or more selected from the group consisting of an aromatic vinyl-based monomer, a vinyl cyan-based monomer, and an alkyl (meth)acrylate monomer and performing polymerization, and, in presence of the seed, preparing an acrylic rubber-based polymer by adding an alkyl (meth)acrylate monomer and performing polymerization; and
(ii) in presence of the acrylic rubber-based polymer, preparing a shell by adding an aromatic vinyl-based monomer, a vinyl cyan-based monomer, and an emulsifier including a salt of a compound represented by Chemical Formula 1 and performing polymerization.

11. The method of claim 10, wherein the emulsifier including a salt of a compound represented by Chemical Formula 1 is added in an amount of 0.1 to 2.0 parts by weight with respect to 100 parts by weight of sum of the alkyl (meth)acrylate monomer, the aromatic vinyl-based monomer, and the vinyl cyan-based monomer.

* * * * *